Figure 1:
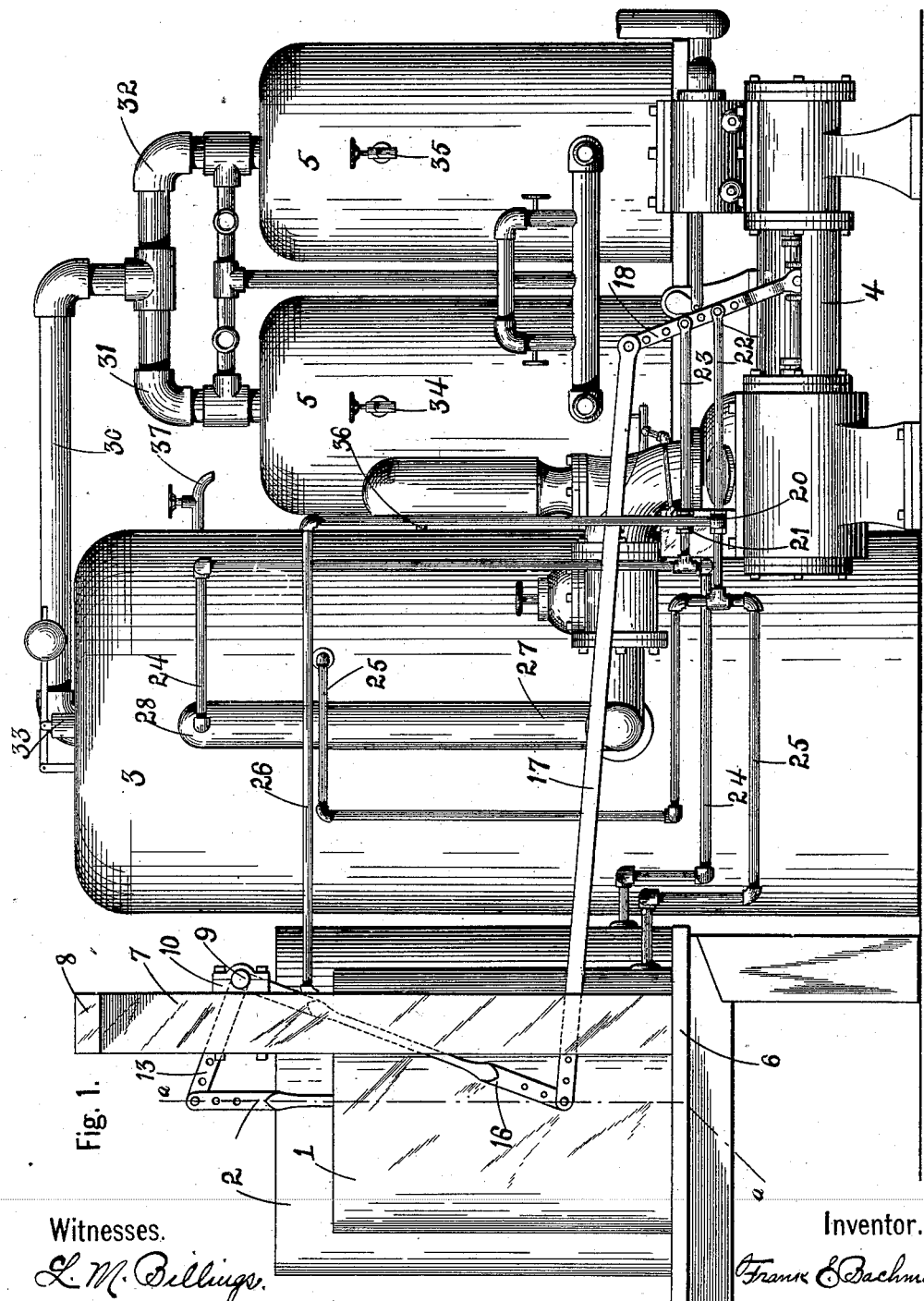

No. 650,216. Patented May 22, 1900.
F. E. BACHMAN.
METHOD OF PURIFYING WATER.
(Application filed Aug. 19, 1899.)
(No Model.) 3 Sheets—Sheet 1.

Witnesses.
L. M. Billings.
G. A. Neubauer.

Inventor.
Frank E. Bachman.
By A. J. Sangster, Attorney.

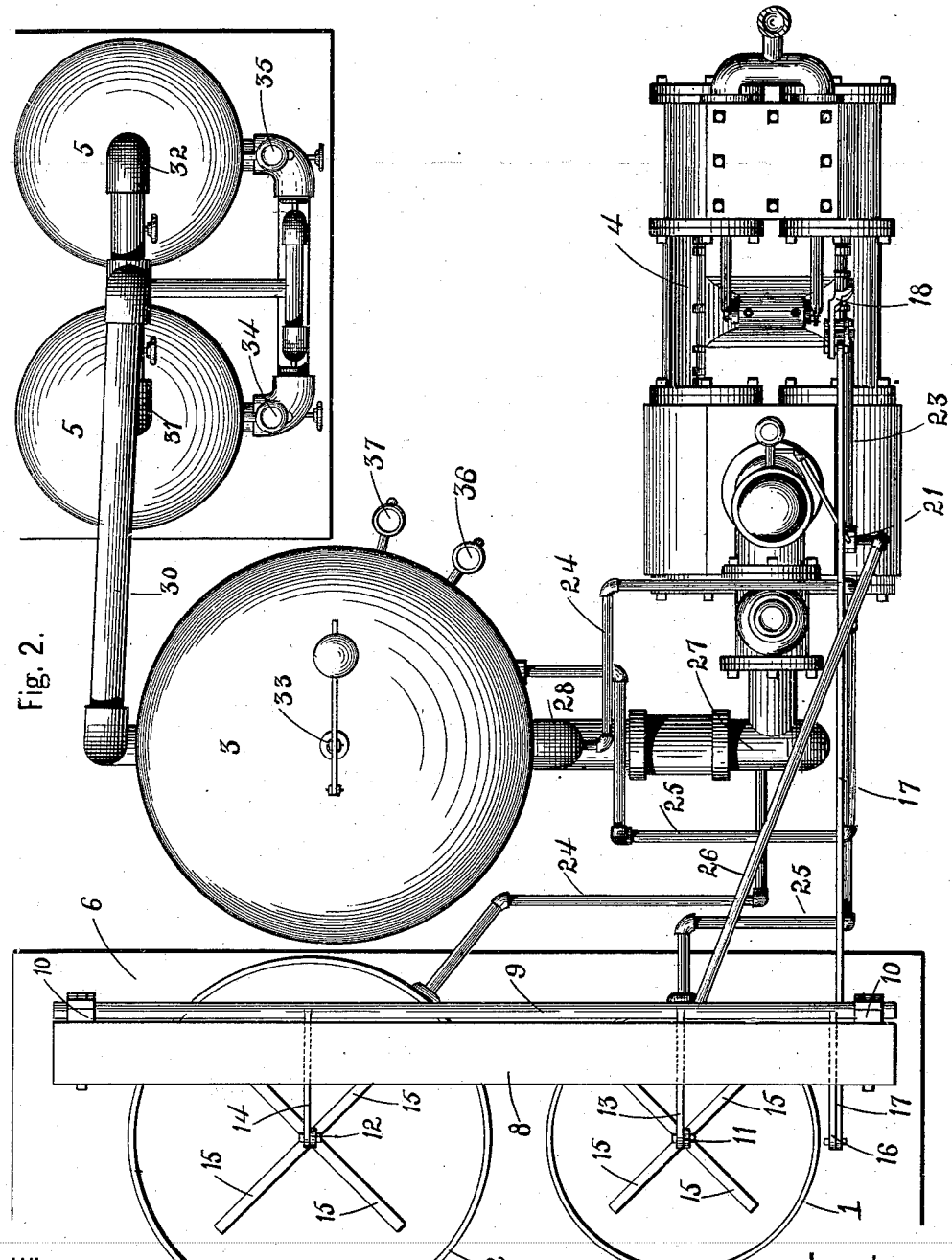

No. 650,216. Patented May 22, 1900.
F. E. BACHMAN.
METHOD OF PURIFYING WATER.
(Application filed Aug. 19, 1899.)
(No Model.) 3 Sheets—Sheet 3.
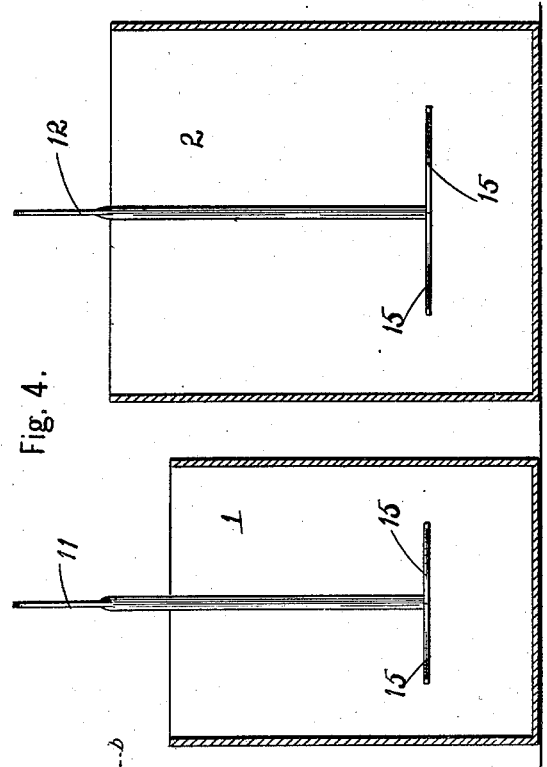
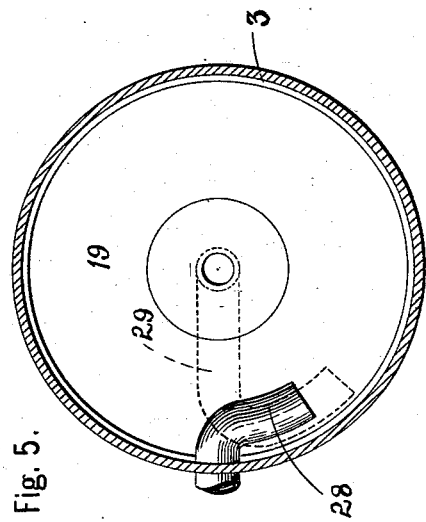
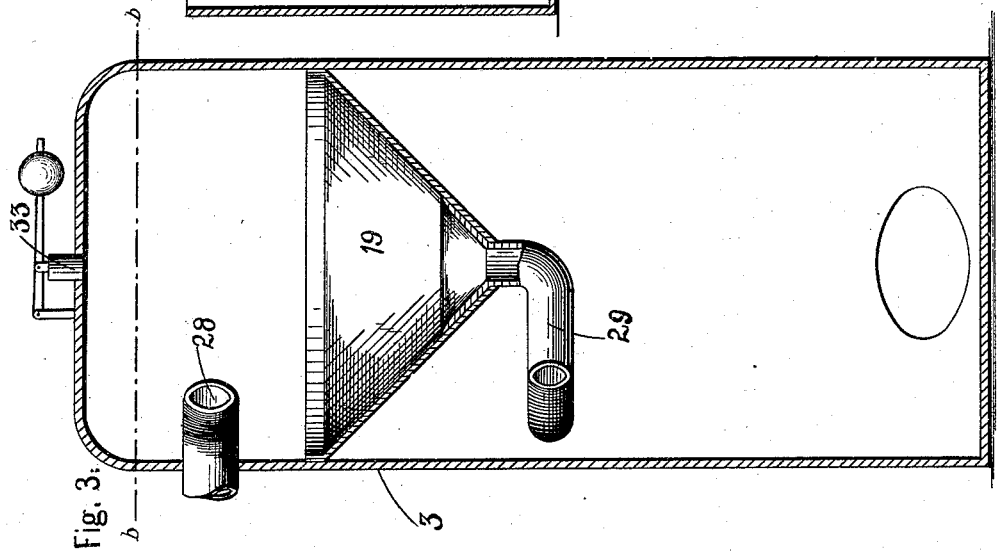
Witnesses.
L. M. Billings.
G. A. Neubauer.
Inventor.
Frank E. Bachman,
By A. J. Sangster, Attorney.

UNITED STATES PATENT OFFICE.

FRANK E. BACHMAN, OF BUFFALO, NEW YORK.

METHOD OF PURIFYING WATER.

SPECIFICATION forming part of Letters Patent No. 650,216, dated May 22, 1900.

Application filed August 19, 1899. Serial No. 727,821. (No specimens.)

*To all whom it may concern:*

Be it known that I, FRANK E. BACHMAN, a citizen of the United States, residing at Buffalo, in the county of Erie and State of New York, have invented a certain new and useful Improved Method of Removing Impurities from Water, of which the following is a specification.

My invention relates to an improved method of removing oil or similar impurities from water by introducing chemicals to cause precipitation and substances to coat the precipitate and prevent its particles adhering together or to the filtering material, thereby maintaining the filtering material in condition to permit the passage of water, and thus prevent the clogging of the filter; and for a full understanding of the merits and advantages of the invention reference is to be had to the accompanying drawings and the following description, in which—

Figure 1 represents a side elevation of a suitable apparatus adapted to be used in connection with my improved method of removing impurities from water. Fig. 2 is a top plan view of the same. Fig. 3 is a vertical longitudinal section through the precipitating or mixing vessel or tank. Fig. 4 is a vertical section through the tanks for holding the chemicals on or about line $a\ a$, Fig. 1. Fig. 5 is a horizontal section through the mixing-tank on or about line $b\ b$, Fig. 3.

In using water containing condensed steam from engines, pumps, or either by itself or mixed with natural water for industrial purposes there is always danger and loss arising from the deposit formed on the shell of the boiler by the oil or residue of the oil used to lubricate the steam-cylinder and the scale formed where condensed steam is mixed with the natural water by the oil or residue from the oil and the scale-forming ingredients of the natural water, which scale-forming ingredients are generally carbonates of lime and magnesia, sulfates and chlorids of iron and alumina, lime, and magnesia, and at times carbonates and sulfates of lithia and other metals. There may also be present free mineral and vegetable acids which will corrode boilers or other metallic substances. For many industrial purposes other than steam-raising—such, for instance, as ice-making—the presence of oil prevents the use of condensed water containing it. I have discovered that if lime, lime-water, or its equivalent be mixed with water containing oil in sufficient quantity to combine with any carbonic acid, free acids, and acid radicals of any salts present in the water and leave an excess the excess of lime will unite with the oil, especially the animal and vegetable oils which form boiler deposits, to form a combined oil and lime soap or compound which is insoluble and can be readily filtered from the water, together with the carbonates of lime and magnesia rendered insoluble in the water by the removal of the carbonic acid which was in solution in the natural water and the hydrated oxids of the metals, such as iron and alumina, which were present as soluble metallic salts. There will be left in the water in solution any sulfates and chlorids of lime and magnesia which were in it originally, together with any which may be formed of any free sulfates or hydrochloric acid or any salts of these acids which are decomposed by lime, such as iron-salts, together with the excess of lime or lime-water added. If it is desired to further purify the water and the sulfates and chlorids and to neutralize any free vegetable acids which the lime has not neutralized, I add to the water soda or pearlash ($Na_2CO_3$ or $K_2CO_3$) or their equivalents, which combines with the sulfates and chlorids of lime and magnesia to form carbonates of lime and magnesia, which are insoluble, and sulfates and chlorid of soda or potash, which are neither injurious nor scale-forming. We will then have in the water as insoluble solid matter the carbonates of lime formed by the union of the carbonic acid in the water and the lime or lime-water added, the greater part of the carbonates of lime and magnesia originally in solution in the water, any iron, as hydrated sesque or protoxid, or both, alumina in the same state, the lime soap or emulsion, and carbonates of lime and magnesia formed by the soda or pearlash, and in solution a portion of the carbonates of lime and magnesia, which are not precipitated by the lime or lime-water, together with sodium or potassium sulfate and soluble salts of any organic acids present originally, all of which, except the carbonates of lime and magnesia, are very soluble and non-injurious.

To remove the carbonates of lime and magnesia, I add a small portion of caustic soda or potash, which renders their precipitation practically perfect. If the precipitated carbonates of lime and magnesia are not mixed with a considerable portion of hydrated oxids of iron or alumina, as is rarely the case, they will clog a filter, forming a solid mass in it by attaching the crystals to the material of the filter-bed and to each other so strongly that they cannot be removed in the ordinary way. To prevent this clogging, I add to the water, either with the lime or lime-water or with the soda or pearlash, or before, between, or after these additions, a flocculent gelatinous or flocculent non-crystallizing substance which coats the lime and magnesia carbonate crystals, preventing their adhering together and to the filtering material and at the same time filling the spaces between the material forming the filter-bed, so as to prevent the passage of the finest particles of clay or sand which may be held in the water in suspension and not preventing the flow of the water. There are many substances which may be used for this purpose, such as the hydrated oxids of all the metals, freshly-precipitated sulfids of the metals, &c.

A suitable apparatus for carrying out my improved method of purifying water is composed of tanks or receptacles for the necessary chemicals, a mixing tank or receptacle, a pumping device, and a filtering medium.

In the preferred adaptation of the apparatus shown in the drawings like numerals designate like parts.

The tanks containing solutions of the necessary chemicals are designated by the numerals 1 and 2, the mixing-tank by the numeral 3, the pumping device, which may be of any well-known design, by the numeral 4, and the filtering-tanks by the numeral 5.

The chemical-containing tanks 1 and 2 are preferably supported upon a stand or table 6, having upright standard 7 and a cross-beam 8, and a rocking shaft 9 is journaled in boxes 10, mounted upon the standards. Agitating-rods 11 and 12, pivotally suspended from crank-arms 13 and 14, projecting from the shaft, project into the tanks 1 and 2 and are provided at their lower ends with the crossed bars 15. An operating arm or crank 16 extends from the shaft and is pivoted at its lower end to one end of a connecting-rod 17, which in turn is operatively connected to the pumping device through a supplementary rocking arm 18, so that the operation of the pump will maintain the chemical solution in a state of agitation to prevent settling.

The mixing-tank 3 is divided into an upper and lower compartment by a diaphragmatic plate or partition 19, which is preferably of a cone formation. Small pumps 20 and 21 for forcing the substances into the mixing-tank are operated from the main pump by connecting their piston-rods 22 and 23 to the supplementary rocking arm 18, the solutions being conducted from the tanks 1 and 2 to the mixing-tank by the pipes 24 and 25, one of which extends into communication with the upper compartment of the tank and the other into communication with the lower compartment. The pump 20 is also provided with an auxiliary device for conducting the lime solution that leaks through the pump back into its tanks, and consists of a pipe 26, the upper end of which is bent above the tank, the action of the pump forcing the excessive solution through the pipe 26 and again into its tank.

In purifying water by my process the water is pumped from the source of supply through the pumping device into the upper compartment of the mixing-tank by means of the pipe 27, the end 28 of which extends within the tank and is curved to give a swirling motion to the water, the lime solution is added to the water in this compartment, and the combined liquid solution and water passes into the lower compartment through the pipe 29, which extends from the lower end of the cone-shaped diaphragm and is bent to give a swirling motion to the water. The soda solution is added to and thoroughly mixed with the water-and-lime solution in the lower compartment by the swirling motion and is then conducted through the pipe 30 and the continuations 31 and 32 of said pipes into the filtering-tanks 5 and from thence to the boiler or other desired place.

The mixing-tank is provided with a safety device 33 and testing devices for testing the proportions of the solutions and at various steps in the process are attached to different portions of the apparatus and are designated by the numerals 34, 35, 36, and 37.

It will be observed from the foregoing that my improved process is continuous in its operation.

I claim as my invention—

1. An improved process for purifying water containing oil, which consists in adding lime to water in sufficient quantity to unite with the oil in said water and form an oil-and-lime compound, and also precipitate the carbonates of lime and magnesia, adding soda to combine with the sulfates and chlorids of lime and magnesia to form and precipitate carbonates of lime and magnesia, adding a small amount of caustic soda to precipitate the remaining carbonates of lime and magnesia not acted upon by the lime, adding a substance to coat the precipitate to prevent its particles adhering together or to the filtering material, and then filtering, substantially as specified.

2. An improved process for purifying water containing oil, which consists in adding lime to water in sufficient quantity to unite with the oil in said water and form an oil-and-lime compound, and also precipitate the carbonates of lime and magnesia, adding soda to combine with the sulfates and chlorids of lime and magnesia to form and precipitate carbonates of lime and magnesia, adding a small amount of caustic soda to precipitate the remaining carbonates of lime and magnesia not acted upon by the lime, adding metallic hydrates to coat the precipitate to prevent its particles adhering together or to the filtering material and then filtering through a suitable medium, substantially as specified.

3. An improved process for purifying water containing oil, which consists in adding lime to water in sufficient quantity to unite with the oil in said water and form an oil-and-lime compound, adding soda to combine with the sulfates and chlorids of lime and magnesia to precipitate carbonates of lime and magnesia, adding a substance to coat the precipitate to prevent its particles adhering together or to the filtering material, and then filtering, substantially as specified.

4. An improved process for purifying water containing oil, which consists in adding lime to water in sufficient quantity to unite with the oil in said water and form an oil-and-lime compound, adding soda to combine with the sulfates and chlorids of lime and magnesia to form and precipitate carbonates of lime and magnesia, adding hydrates to coat the precipitate to prevent its particles adhering together or to the filtering material and then filtering through a suitable medium, substantially as specified.

5. An improved process for purifying hot water containing oil which consists in adding lime to the water in sufficient quantity to unite with the oil in said water and form an oil-and-lime compound, and also precipitate the carbonates of lime and magnesia, adding soda to combine with the sulfates and chlorids of lime and magnesia to form and precipitate carbonates of lime and magnesia, adding a small amount of caustic soda to precipitate the remaining carbonates of lime and magnesia and then filtering through a suitable medium, as specified.

6. An improved process for purifying water containing oil, which consists in adding lime to water in sufficient quantity to unite with the oil in said water and form an oil-and-lime compound, and also precipitate the carbonates of lime and magnesia, adding soda to combine with the sulfates and chlorids of lime and magnesia to form and precipitate carbonates of lime and magnesia, adding a small amount of caustic soda to precipitate the remaining carbonates of lime and magnesia not acted upon by lime, and then filtering, substantially as specified.

FRANK E. BACHMAN.

Witnesses:
L. M. BILLINGS,
A. J. SANGSTER.